(12) United States Patent
Masuda

(10) Patent No.: US 7,222,692 B2
(45) Date of Patent: May 29, 2007

(54) AUXILIARY MACHINE MOUNTING STRUCTURE OF FUEL CELL VEHICLE

(75) Inventor: Takahiko Masuda, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 83 days.

(21) Appl. No.: 10/755,317

(22) Filed: Jan. 13, 2004

(65) Prior Publication Data
US 2004/0159478 A1 Aug. 19, 2004

(30) Foreign Application Priority Data
Feb. 13, 2003 (JP) .............................. 2003-035551

(51) Int. Cl.
*B60K 1/00* (2006.01)
(52) U.S. Cl. .................... 180/291; 180/312; 180/65.1
(58) Field of Classification Search ............. 180/291, 180/65.2, 11, 12, 311, 312, 313, 65.1, 298, 180/65.3
See application file for complete search history.

(56) References Cited

U.S. PATENT DOCUMENTS 6,402,229 B1 * 6/2002 Suganuma ............. 296/203.02

2002/0189873 A1 * 12/2002 Mizuno ..................... 180/65.3

FOREIGN PATENT DOCUMENTS

| DE | 35 22 447 A1 | 7/1986 |
| EP | 1 115 165 A2 | 7/2001 |
| JP | 9-052534 A | 2/1997 |
| JP | 1 266 783 A2 | 12/2002 |

* cited by examiner

*Primary Examiner*—Christopher P. Ellis
*Assistant Examiner*—John Walters
(74) *Attorney, Agent, or Firm*—Foley & Lardner LLP (57) ABSTRACT

A structure for mounting auxiliary machines of a fuel cell vehicle, which includes a motor, a power supply unit, and auxiliary machines, provided in a motor compartment of the fuel cell vehicle. The motor is disposed at a lower part in the motor compartment. The power supply unit is provided above the motor. The auxiliary machines are mounted on a frame member which extends in a vehicle transverse direction in front of the motor and the power supply unit.

15 Claims, 6 Drawing Sheets

AUXILIARY MACHINE MOUNTING STRUCTURE OF FUEL CELL VEHICLE

BACKGROUND OF THE INVENTION

1. Field of the Invention

The present invention relates to an auxiliary machine mounting structure of a fuel cell vehicle.

2. Description of Related Art

Generally, auxiliary machines of an electric vehicle, such as an air conditioner compressor, a power steering pump or the like are arranged inside a motor compartment of the electric vehicle.

Japanese Patent Application Laid-open Publication No. H09-52534 discloses a structure where a power manager serving as a power supply unit to a drive motor, and an air conditioner compressor and a power steering pump serving as auxiliary machines are arranged on a mounting member which extends in a transverse direction of an electric vehicle inside a motor compartment thereof, and has downwardly bent end portions fixed to side members of the electric vehicle.

SUMMARY OF THE INVENTION

In the fuel cell vehicle, however, it is required to compactly arrange, together with the above-mentioned auxiliary machines, receptacles such as a water tank, electrically-operated machines such as a water pump, and control devices such as a DC/DC converter and a pump controller, while ensuring safety upon a collision of the vehicle, cooling efficiency of the auxiliary machines during operation, and workability for a maintenance work including mounting/dismounting thereof.

The present invention was made in the light of this problem. An object of the present invention is to provide an auxiliary machine mounting structure of a fuel cell vehicle, which provides a compact arrangement of machines/equipments thereof within a limited space of a motor compartment thereof, and is capable of absorbing an impact load efficiently upon a collision of the vehicle.

An aspect of the present invention is an auxiliary machine mounting structure of a fuel cell vehicle comprising: a motor, a power supply unit, and auxiliary machines, provided in a motor compartment of the fuel cell vehicle, wherein the motor is disposed at a lower part in the motor compartment, the power supply unit is provided above the motor, and the auxiliary machines are mounted on a frame member which extends in a vehicle transverse direction in front of the motor and the power supply unit.

BRIEF DESCRIPTION OF THE DRAWINGS

The invention will now be described with reference to the accompanying drawings wherein.

DETAILED DESCRIPTION OF THE PREFERRED EMBODIMENT

An embodiment of the present invention will be explained below with reference to the drawings, wherein like members are designated by like reference characters.

Figure 1:
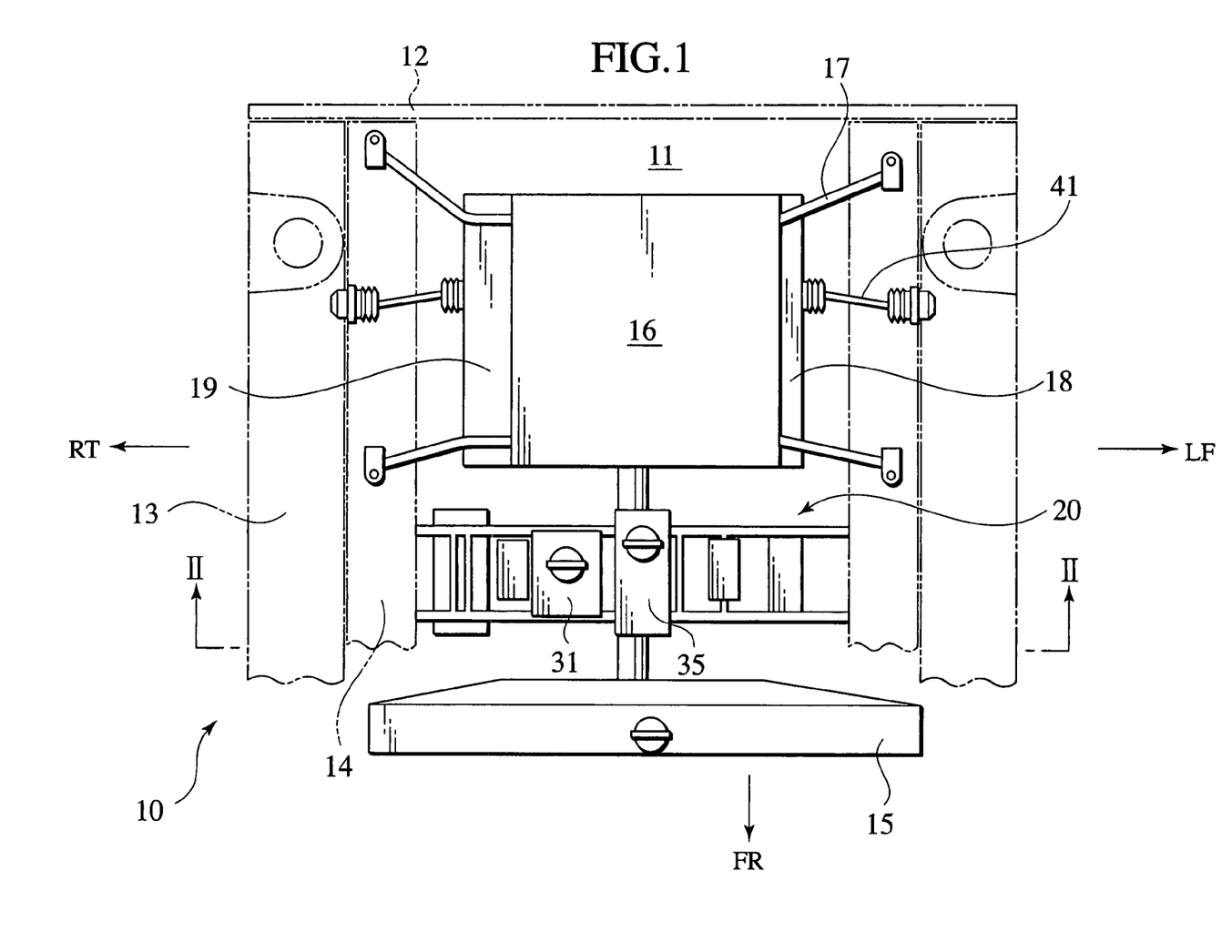
FIG. 1 is a plan view of a vehicle front section of a fuel cell vehicle which employs an auxiliary machine mounting structure according to an embodiment of the present invention.

FIG. 1 is a plan view of a motor compartment 11 provided at a vehicle front section 10. On the rear side of the motor compartment 11, a dash panel 12 is provided to define the rear end thereof, extending in a vehicle transverse direction. On both left and right sides of the motor compartment 11, hood ledge panels 13 extending in a vehicle longitudinal direction and side members 14 provided along the hood ledge panels 13 on a transversely inner side thereof are provided to define the left and right sides of the motor compartment 11. A radiator 15 is arranged in a front part of the motor compartment 11.

In a rear part of the motor compartment 11, a power manager 16 serving as a power supply unit is mounted on a supporting member 17 whose four arms are extended transversely outward from the power manager 16 and fixed to the side members 14 at the respective ends thereof. The power manager 16 distributes power generated by a fuel cell stack and/or stored by a secondary battery (not shown) to auxiliary machines or the drive motor 19. The power supply unit is not limited to the power manager 16, but it may be a fuel cell stack.

The drive motor 19 provided with a reduction gear 18 serving as a transmission is disposed below the power manager 16. In this embodiment, the drive motor 19 is disposed on the right side of the vehicle, and the reduction gear 18 is coupled to the drive motor 19 on the left side thereof.

On the front side of the power manager 16, a ladder-like mounting frame 20 for the auxiliary machines is provided, which extends in the vehicle transverse direction so as to bridge the left and right side members 14, and on which a plurality of auxiliary machines described later are mounted.

Figure 2:
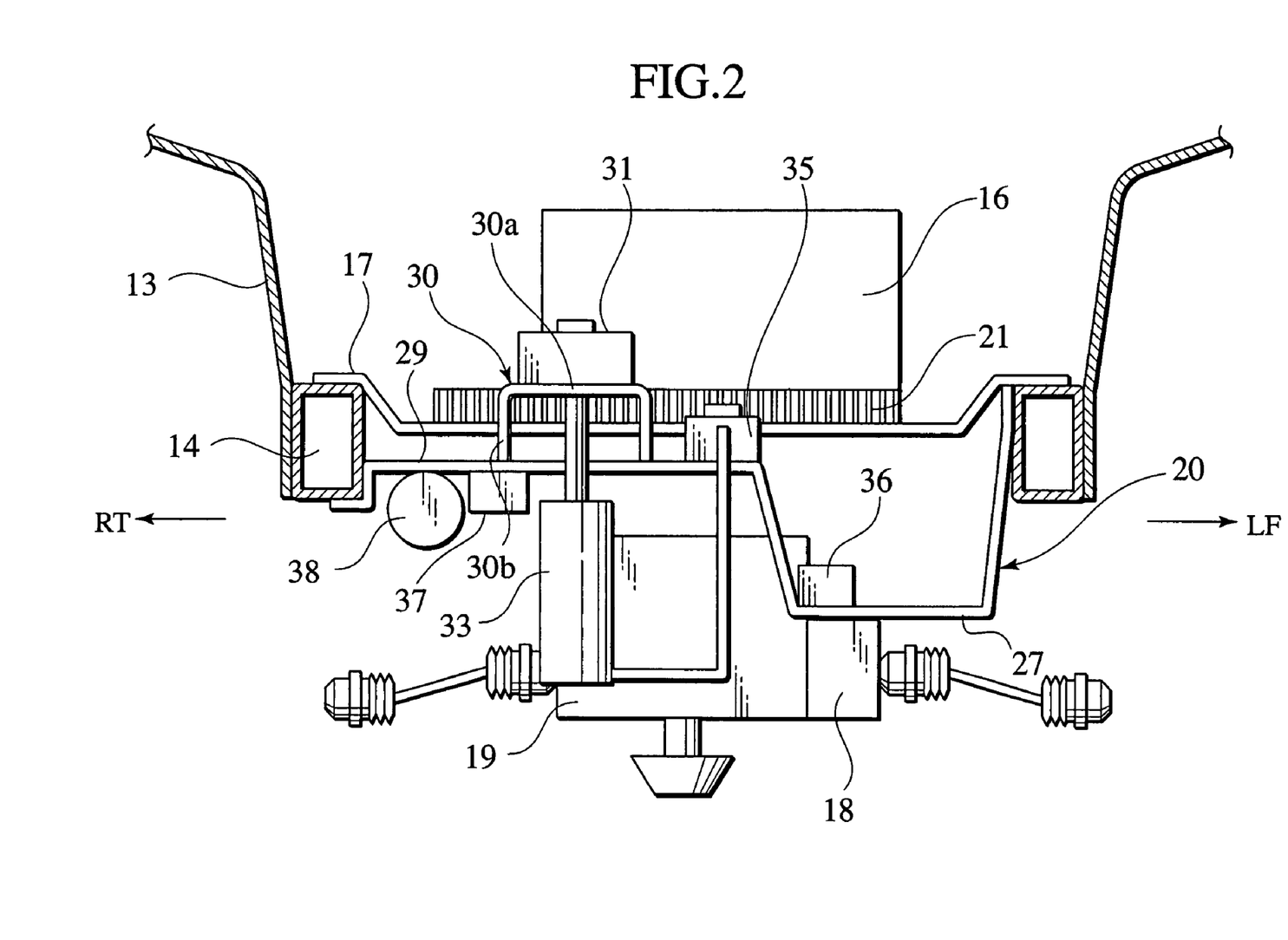
FIG. 2 is a sectional view of the vehicle front section taken along line II—II in FIG. 1.

FIG. 2 is a sectional view of the vehicle front section, taken along line II—II in FIG. 1. On an upper face of the supporting member 17, a number of vertical cooling fins 21 are provided along the vehicle transverse direction, and the power manager 16 is disposed on the cooling fins 21. The mounting frame 20 is formed such that the left part thereof on the reduction gear 18 side is bent downward.

Figure 3:
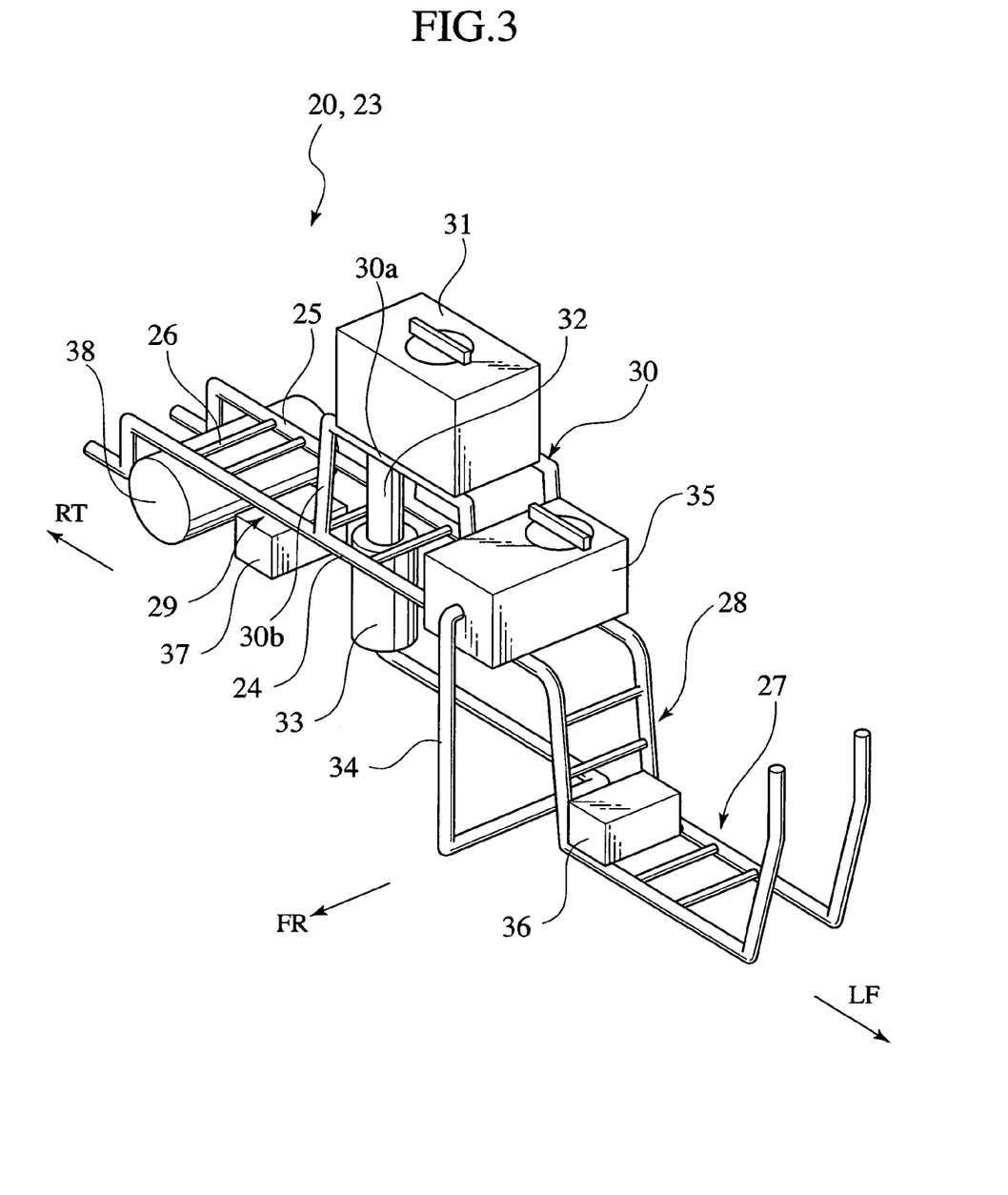
FIG. 3 is a perspective view of an auxiliary machine module according to the embodiment of the present invention.
Figure 4:
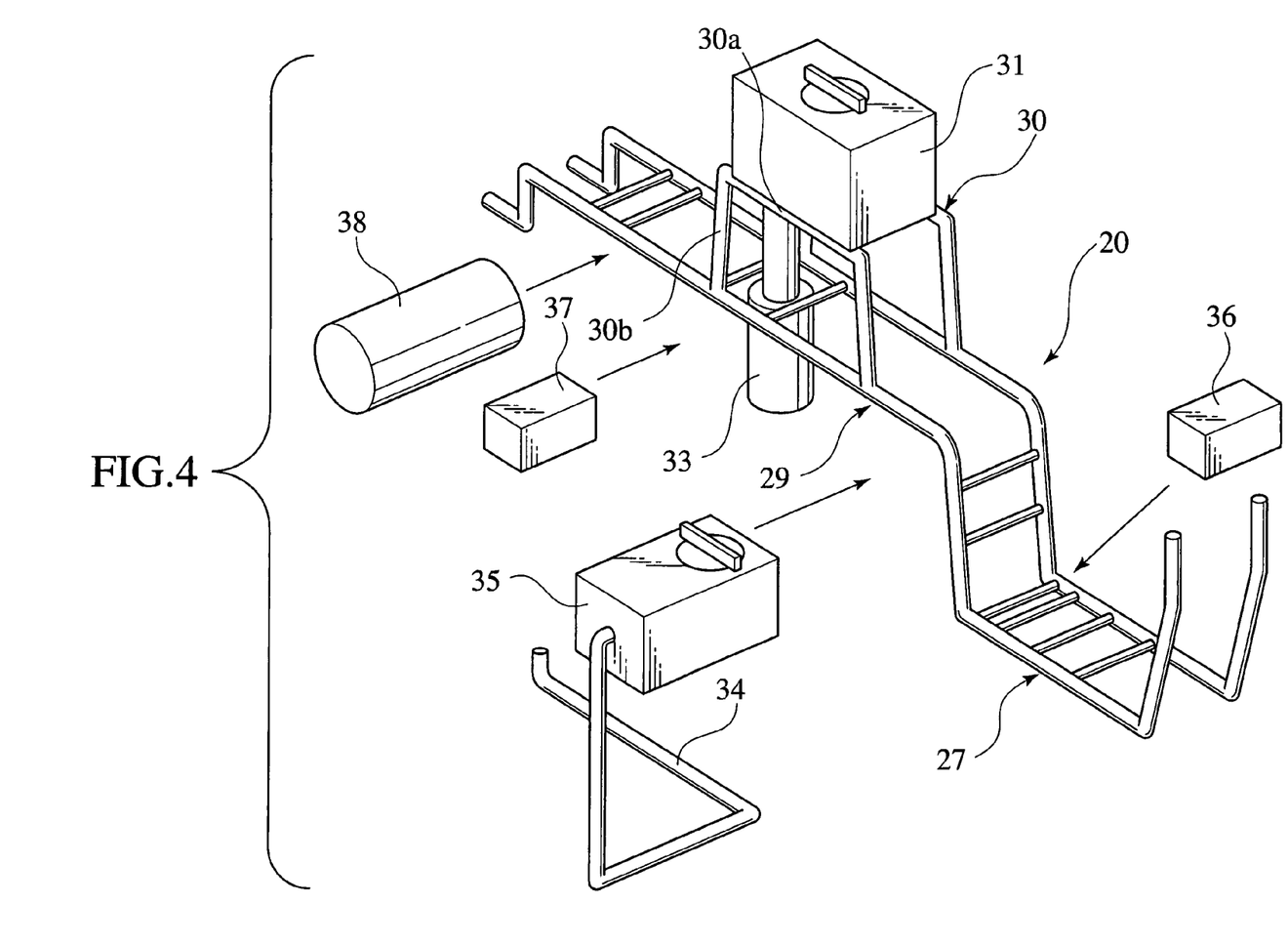
FIG. 4 is an exploded perspective view of the auxiliary machine module shown in FIG. 3.

FIG. 3 is a perspective view showing an auxiliary machine module 23 including a plurality of auxiliary machines mounted to the mounting frame 20, and FIG. 4 is a perspective view showing auxiliary machines mounted to the mounting frame 20.

The mounting frame 20 is constituted of a front cross frame 24 which is a front main beam extending in the vehicle transverse direction, a rear cross frame 25 which is a rear main beam extending substantially parallel to the front cross frame 24 on a rear side thereof, and a plurality of connecting frames 26 which are sub-beams bridging the front cross frame 24 and the rear cross frame 25 and extending in the vehicle longitudinal direction. The mounting frame 20 is formed to have a lower frame portion 27 on its left side, and an intermediate frame portion 28 extending upward from the right end of the lower frame portion 27, and on its right side, a first horizontal portion 29 extending rightward from the upper end of the intermediate frame portion 28. On the first horizontal portion 29, a stand 30 is provided, which has four leg portions 30b, two of which on the front side extend upward from the front cross frame 24 and the other two on the rear side extend upward from the rear cross frame 25 of the first horizontal portion 29; and second horizontal portions 30a connecting the upper ends of the leg portions 30b. As shown in FIG. 3, a cooling water tank 31 is mounted on the second horizontal portions 30a of the stand 30. A cooling water pump 33 is disposed under the cooling water tank 31 below the first horizontal portion 29. The cooling water tank 31 is connected to the cooling water pump 33 through piping 32. The cooling water pump 33 is connected to a cooling water sub-tank 35 via a cooling water pipe 34.

Further, as shown in FIG. 4, various auxiliary machines are mounted on the mounting frame 20. A DC/DC converter 36 is mounted on the lower frame portion 27, the cooling water sub-tank 35 is mounted on the left end portion of the first horizontal portion 29, and the cooling water tank 31 is mounted on the second horizontal portion 30a of the stand 30. A pump controller 37 and a power steering pump 38 are mounted on a lower side of the first horizontal portion 29.

The auxiliary machines, namely, the cooling water tank 31, the DC/DC converter 36, the cooling water sub-tank 35, the pump controller 37 and the power steering pump 38 are mounted on the frame 20 with brackets fixed thereon by bolts (not shown) or the like with insulators interposed therebetween. Each of the connecting frames 26 are positioned properly according to the loads or sizes of the auxiliary machines, serving as cross members for the main beams. Further, since each connecting frame 26 is formed such that its upper face is flat, it serves as a seat for mounting an auxiliary machine, thereby eliminating a task of suspending the auxiliary machine during mounting thereof.

These auxiliary machines, tubes and piping can be mounted to the mounting frame 20 before the auxiliary machine module 23 is mounted on a vehicle, and bolt fastening work or the like in a confined space can be eliminated, improving mounting workability. Further, since wire harness mounting work and/or wiring work to the pump controller 37 and the DC/DC converter 36 can be conducted before mounting thereof on the vehicle, workability can be further improved. Furthermore, a heater for an air-conditioning device, an ABS unit and the like may be mounted on the mounting frame 20.

Since the mounting frame 20 is constituted of the main beams and the sub-beams, strength thereof can be improved, and since the mounting frame 20 with a high rigidity are connected to the side members 14, the torsional rigidity of a vehicle body can be increased.

Figure 5:
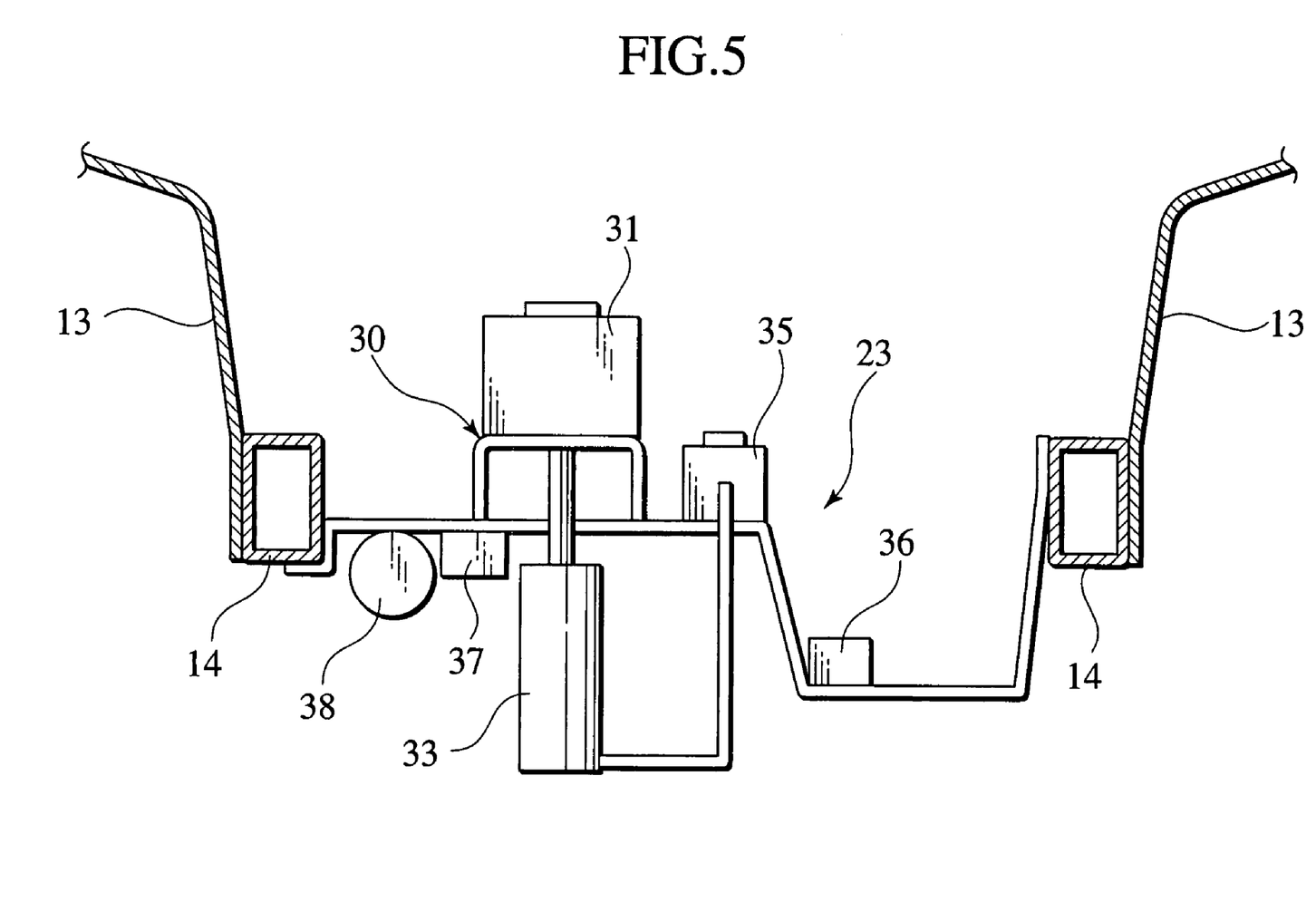
FIG. 5 is a front view of the auxiliary machine module shown in FIG. 3 mounted on a vehicle body.

FIG. 5 is a front view of the auxiliary machine module 23. Since various auxiliary machines are arranged so as not to overlap with one another, as viewed from the vehicle front side, that is, no auxiliary machine is arranged in the same position in the vehicle transverse direction and in the same level, heat generating machines/equipments such as the cooling water pump 33, the pump controller 37, the DC/CD converter 36, and the like can be cooled efficiently, and adjustment and replacement work of each auxiliary machine is facilitated.

Figure 6:
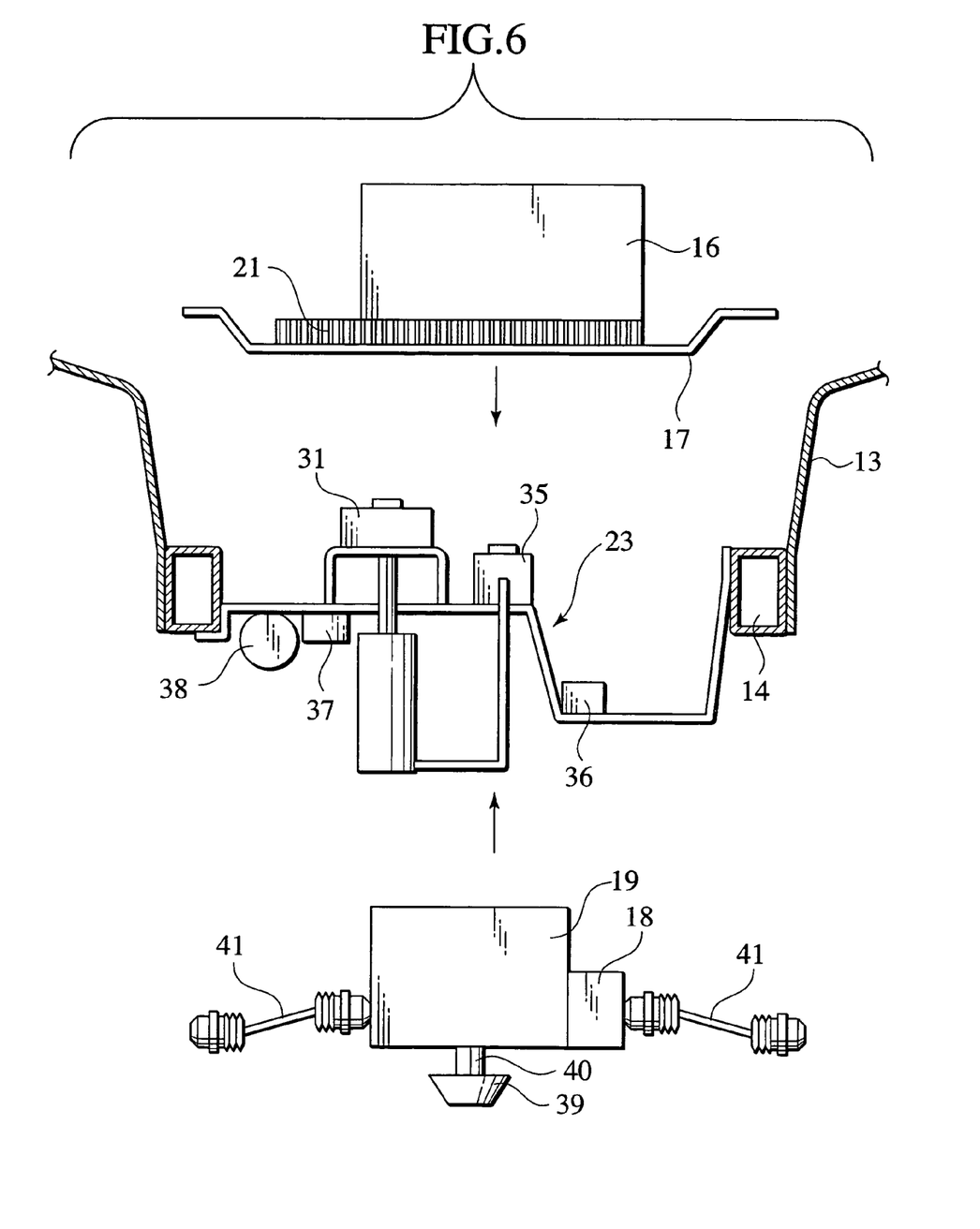
FIG. 6 is a front view showing a power manager and a motor and drivetrain unit mounted to the auxiliary machine module shown in FIG. 5.

FIG. 6 is a front view showing a mounting procedure for the power manager 16 and the motor and drivetrain unit which includes the drive motor 19 and the reduction gear 18. The power manager 16 is mounted to the supporting member 17 on the cooling fins 21, as described above. The supporting member 17 sub-assembled with the power manager 16 is carried into the motor compartment 11 from above the vehicle and fixed to the side members 14 therein. The drive motor 19 and the reduction gear 18 are fixed to a center member 39 via a motor mounting 40, and the sub-assembled motor and drivetrain unit is carried into the motor compartment 11 from below the vehicle and mounted therein. Drive shafts 41 are linked to the reduction gear 18 and the drive motor 19.

According to the auxiliary machine mounting structure of the fuel cell vehicle having the above-described constitution, since the auxiliary machines are arranged in a 3-dimensional manner in a space on the front side of the drive motor 19 and the power supply unit 16, the auxiliary machines can be efficiently arranged in the motor compartment 11.

Further, after the auxiliary machines are mounted to the mounting frame 20 and wiring and piping works are conducted, the auxiliary machines can be mounted to a vehicle collectively by sub-assembling the mounting frame 20 together with the auxiliary machines provided therewith, whereby workability of assembling the auxiliary machines and the mounting frame 20 is improved.

As shown in FIG. 2, the cooling fins 21 of the power manager 16 are positioned at a level between the first horizontal portion 29 and the second horizontal portion 30a of the mounting frame 20. Further, as shown in FIG. 3, the cooling water tank 31 is disposed on the second horizontal portion 30a of the stand 30 and the cooling water pump 33 is disposed below the first horizontal portion 29. Since cooling air taken in from the vehicle front flows inside the motor compartment 11 and reaches the cooling fins 21 between the first horizontal portion 29 and the second horizontal portion 30a without any obstruction of the auxiliary machines, the power manager 16 is efficiently cooled.

As shown in FIG. 2, since the auxiliary machines are mounted on the mounting frame 20 such that a forced cooling air flow directly reaches the cooling fins 21 of the power manager 16 without being blocked by the auxiliary machines and strikes thereon, a performance of the power manager 16 is improved.

As shown in FIG. 1, since tanks having a hollow structure which is easy to deform, such as the cooling water tank 31 or the cooling water sub-tank 35, are arranged on the front side of the power manager 16 and the drive motor 19, the sub-beams constituting the mounting frame 20 deform, upon a vehicle front collision, together with the easy-to-deform auxiliary machines such as the cooling water tank 31, the cooling water sub-tank 35 and the like, to efficiently absorb the impact energy of the collision.

As shown in FIG. 5, since the plurality of auxiliary machines are positioned so as not to overlap with one another, as viewed from the vehicle front, a size of the space required for arranging the auxiliary machines is minimized in the vehicle longitudinal direction, and the auxiliary machines can be cooled by cooling air flow from the vehicle front, providing the improved cooling performance for the auxiliary machines. Further, adjustment and replacement works for each auxiliary machine can be facilitated and a replacement of the power manager 16 can be performed by other auxiliary machines sub-assembled on the mounting frame 20.

As shown in FIG. 3, the mounting frame 20 has a bent shape, as viewed from the vehicle front, providing flexible layout of the auxiliary machines on the mounting frame 20 in the transverse direction and the vertical direction.

As shown in FIG. 2, since the lower frame portion 27 is formed of a part of the mounting frame 20 on the reduction gear 18 side bending downwardly, and the auxiliary machines can be arranged at a relatively open place on the front side of and above the reduction gear 18, the space utilization factor is improved.

As shown in FIG. 3, since the stand 30 is provided above the first horizontal portion 29 and the cooling water tank 31 is mounted on the second horizontal portion 30a of the stand 30 at the top thereof, the cooling water tank 31 can be positioned above the motor compartment 11, whereby maintenance such as replenishment of cooling water to the cooling water tank 31 is facilitated.

Since the mounting frame 20 is formed in a ladder shape, the mounting frame 20 is given an improved rigidity, and the vehicle body around the motor compartment 11 is also provided with an improved torsional rigidity.

As shown in FIG. 2, the electrically-operated auxiliary machines such as the power steering pump 38, each of which has a solid structure and is hard to deform, are positioned so as not to overlap with the drive motor 19 and the power manager 16, as viewed from the vehicle front. Therefore, the electrically-operated machines and the drive motor 19 or the power manager 16 are not interfere with each other, at a vehicle front collision, and the deformation of the mounting frame 20 is not disturbed. Also, cooling air can flow smoothly between the electrically-operated machines generating heat, whereby cooling efficiency thereof is improved.

Incidentally, since the control devices such as the DC/DC converter 36, the pump controller 37 and the like are arranged so as not to overlap with the drive motor 19 and the power manager 16 which is the power supply unit, as viewed from the vehicle front, cooling air can flow smoothly between the heat generating control devices, whereby cooling efficiency thereof is improved.

The present disclosure relates to subject matter contained in Japanese Patent Application Publication No. 2003-035551, filed on Feb. 13, 2003, the disclosure of which is expressly incorporated herein by reference in its entirety.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

What is claimed is:

1. An auxiliary machine mounting structure of a fuel cell vehicle comprising:
   a motor, a power supply unit, and auxiliary machines, provided in a motor compartment of the fuel cell vehicle,
   wherein the motor is disposed at a lower part in the motor compartment,
   wherein the power supply unit is provided above the motor and provided with a cooling fin for heat radiation,
   wherein the auxiliary machines are mounted on a frame member,
   wherein the frame member extends in a vehicle transverse direction in front of the motor and the power supply unit, and
   wherein the frame member comprises a plurality of cross frames bent to form a lower horizontal portion and an upper horizontal portion connected by an intermediate frame portion, the lower horizontal portion and the upper horizontal portion extending in the vehicle transverse direction at different height levels and in opposite directions of each other from the intermediate frame portion, and
   wherein the auxiliary machines are connected to the frame member in an arrangement such that a cooling air flow from the front of the fuel cell vehicle is allowed to directly reach the cooling fin of the power supply unit.

2. An auxiliary machine mounting structure of a fuel cell vehicle according to claim 1, wherein the auxiliary machines are positioned so as not to overlap with one another, as viewed from the front of the fuel cell vehicle.

3. An auxiliary machine mounting structure of a fuel cell vehicle according to claim 1, wherein the frame member is formed in a shape bent in a vertical direction to form the intermediate frame portion connecting the upper horizontal and lower horizontal portions.

4. An auxiliary machine mounting structure of a fuel cell vehicle according to claim 3, wherein the motor has a transmission, and a part of the frame member forming the intermediate frame portion bends downward on a side of the transmission.

5. An auxiliary machine mounting structure of a fuel cell vehicle according to claim 3, wherein a cooling water tank as one of the auxiliary machines is mounted on the upper horizontal portion.

6. An auxiliary machine mounting structure of a fuel cell vehicle according to claim 3, wherein the plurality of cross frames comprises a pair of transversely extending front and rear cross frames.

7. An auxiliary machine mounting structure of a fuel cell vehicle according to claim 1, wherein the auxiliary machines are arranged so as not to overlap with the cooling fin of the power supply unit, as viewed from the front of the fuel cell vehicle.

8. An auxiliary machine mounting structure of a fuel cell vehicle according to claim 7, wherein the intermediate frame portion is positioned vertically in relation to the upper and lower horizontal portions, and wherein the auxiliary machines are disposed below the lower horizontal portion and/or above the upper horizontal portion, and the cooling fin of the power supply unit is positioned at a vertical position between the lower horizontal and upper horizontal portions.

9. An auxiliary machine mounting structure of a fuel cell vehicle according to claim 1, wherein the auxiliary machines comprise a tank, and
   wherein the tank is disposed in front of either one of the motor and the power supply unit.

10. An auxiliary machine mounting structure of a fuel cell vehicle according to claim 1, wherein the auxiliary machines comprise an electrically-operated machine, and
    wherein the electrically-operated machine is disposed so as not to overlap with the motor and the power supply unit, as viewed from the front of the fuel cell vehicle.

11. An auxiliary machine mounting structure of a fuel cell vehicle according to claim 1, wherein the auxiliary machines comprise a controller, and
    wherein the controller is disposed so as not to overlap with the motor and the power supply unit, as viewed from the front of the fuel cell vehicle.

12. An auxiliary machine mounting structure of a fuel cell vehicle according to claim 1, wherein the power supply unit is configured to be mounted on a supporting member fixed to a vehicle body member of the fuel cell vehicle.

13. An auxiliary machine mounting structure of a fuel cell vehicle according to claim 1, wherein the frame member further includes a second horizontal portion located above and/or below the upper horizontal portion and at least one vertical leg portion connecting the second horizontal portion to the upper horizontal portion.

14. An auxiliary machine mounting structure of a fuel cell vehicle according to claim 13, wherein a cooling water tank as one of the auxiliary machines is mounted on the second horizontal portion.

15. An auxiliary machine mounting structure of a fuel cell vehicle according to claim 13, wherein the auxiliary machines are disposed below and/or above a space extending between the upper horizontal portion and the second horizontal portion, and the cooling fin of the power supply unit is positioned at a vertical position between the upper horizontal portion and the second horizontal portion.

* * * * *